United States Patent Office 3,055,920
Patented Sept. 25, 1962

3,055,920
2-HYDROXYMETHYL-Δ²-ANDROSTEN DERIVATIVES AND PROCESS
Albert Bowers, John Edwards, and James C. Orr, all of Mexico City, Mexico, assignors, by mesne assignments, to Syntex Corporation, a corporation of Panama
No Drawing. Filed Oct. 20, 1961, Ser. No. 146,455
Claims priority, application Mexico Feb. 23, 1961
17 Claims. (Cl. 260—397.5)

The present invention relates to certain new cyclopentanoperhydrophenanthrene derivatives and to a method for the preparation of the same.

More particularly, our invention relates to the novel 2-hydroxymethyl, 2-alkoxymethyl, 2-aralkoxymethyl and 2-acyloxymethyl derivatives of Δ² - androsten-17β-ol, which may further possess a 17α-alkyl, alkenyl or alkynyl group; it also comprises the preparation of the esters of such compounds and of the corresponding 19-nor-derivatives.

Such compounds are powerful anabolic agents having a favorable anabolic-androgenic ratio; they help to increase the protein metabolism and the deposition of calcium on the bone tissue; furthermore they show anti-estrogenic activity, lower the cholesterol level in the blood and inhibit the secretion of gonaldotropins by the pituitary gland. The 17α-alkenyl and 17α-alkynyl compounds further exhibit progestational activity.

The novel compounds object of our invention are represented by the following formula:

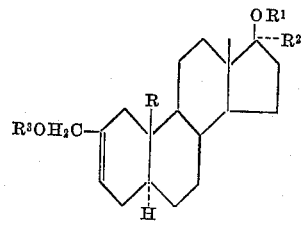

In the above formula R represents hydrogen or methyl; R¹ represents hydrogen or an acyl group derived from a carboxylic acid of 1 to 12 carbon atoms; R² represents hydrogen, an alkyl, alkenyl or alkynyl group such as methyl, ethyl, propyl, vinyl, ethynyl or propynyl, and R³ represents hydrogen, a lower alkyl group, a lower aralkyl group of 1 to 8 carbon atoms or an acyl radical derived from a carboxylic acid of 1 to 12 carbon atoms.

The acyl groups set forth above derive from carboxylic acids of less than 12 carbon atoms, saturated or unsaturated, of straight, branched, cyclic or mixed aliphatic-cyclic chain, substituted or not with groups such as hydroxy, methoxy, amino, halogen or other groups; typical such esters are the acetate, propionate, butyrate, valerate, hemiscuccinate, enanthate, caproate, benzoate, undecenoate, trimethylacetate, phenoxyacetate, cyclopentylpropionate and β-chloropropionate.

The novel compounds object of our invention are obtained from the 2-formyl-17β-hydroxy-Δ²-androstenes and the corresponding 19-nor derivatives.

In our copending patent application Serial No. 128,974, filed August 3, 1961, there is described the preparation of the 2-formyl-Δ²-androstenes starting from a 2-alkoxymethylene derivative of dihydroallotestosterone, 19-nor-dihydroallotestosterone or one of the 17α-alkyl, alkenyl or alkynyl substituted derivatives, which by reduction with a double metal hydride furnish the corresponding 3-hydroxy derivatives. By acid treatment of these compounds in the presence of a proton acceptor there are obtained the 2-formyl-Δ²-androstenes.

By reduction of 2-formyl-Δ²-androsten-17β-ol, or of the 17α-alkyl, alkenyl or alkynyl substituted derivatives, as well as of the corresponding 19-nor derivatives, there are obtained the respective 2-hydroxymethyl compounds, which upon subsequent esterification produce the corresponding mono- or di-esters.

The treatment of the 17-esters of 2-hydroxymethyl-Δ²-androsten-17β-ol, 2-hydroxymethyl-19-nor-Δ²-androsten-17β-ol or of the 17α-substituted derivatives with an etherifying agent gives rise to the formation of the 2-alkoxy and 2-aralkoxy compounds.

The method described above for preparing the 2-hydroxymethyl and 2-acyloxymethyl derivatives is illustrated by the following sequence of reactions:

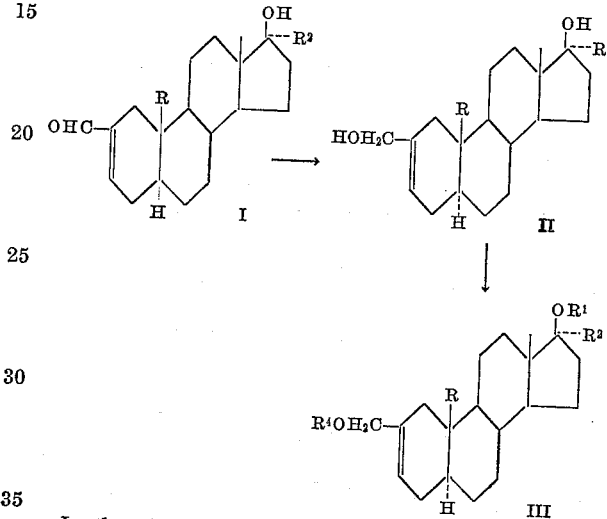

In the above formulas R, R¹ and R² have the same meaning as set forth above; R⁴ represents and acyl radical of less than 12 carbon atoms.

In practicing the process outlined above, 2-formyl-Δ²-androsten-17β-ol or one of the 17α-substituted derivatives thereof (I; R=Me) is subjected to reduction with a double metal hydride, such as sodium borohydride or potassium borohydride, in a solvent inert to the reaction, such as methanol, tetrahydrofuran or dioxane, at room temperature for a prolonged period of time or under reflux for 1 hour, to produce the corresponding 2-hydroxymethyl derivatives (II, R=Me). Esterification of such compounds with anhydrides or chlorides derived from carboxylic acids of 1 to 12 carbon atoms, in pyridine or benzene solution, produces the 2,17-diesters (III; R=Me, R²=hydrogen) or 2-monoesters (III; R=Me, R²=alkyl, alkenyl or alkynyl). The C-2 monoesters may be esterified at C-17 with the same or a different acid anhydride or chloride of hydrocarbon carboxylic acids of less than 12 carbon atoms, in benzene solution and in the presence of p-toluenesulfonic acid.

In the same manner, the process described above is applied to the 2-formyl-19-nor-Δ²-androstenes, thus producing 2-hydroxymethyl-19-nor-Δ²-androsten-17β-ol and the corresponding 17α-alkyl, alkenyl and alkynyl derivatives, as well as the mono- and diesters of such compounds.

Alternatively, there may be employed as starting material and ester of 2-formyl-Δ²-androsten-17β-ol, of 2-formyl-19-nor-Δ²-androsten-17β-ol or of the corresponding 17α-substituted derivatives, which on reduction with a double alkali metal hydride in dioxane or tetrahydrofuran under anhydrous conditions, to avoid hydrolysis of the acyloxy groups, produce the corresponding 17-esters of 2-hydroxymethyl-17β-hydroxy-Δ²-androstenes and 19-nor-androstenes.

The novel 2-alkoxy and 2-aralkoxy compounds object of our invention are obtained by the method illustrated by the following sequence of reactions:

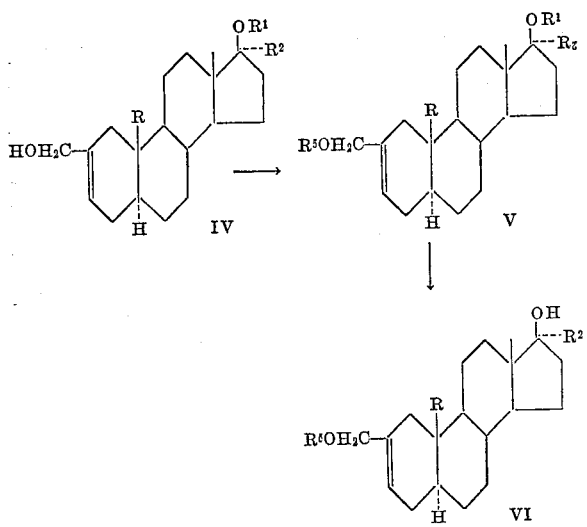

In the above formulas R, $R^1$ and $R^2$ have the same meaning set forth previously; $R^5$ represents a lower alkyl or aralkyl group containing up to 8 carbon atoms.

In practicing the process just outlined, a 17-ester of 2-hydroxymethyl-$\Delta^2$-androsten-17β-ol, which may further possess a substituent at C–17α of the type set forth above, or from the corresponding 19-nor derivatives (IV), is allowed to react at room temperature with an excess of an ether solution of a diazoalkane, such as diazomethane or diazoethane, and in the presence of a catalyst, such as boron trifluoride or aluminum chloride, to produce the 2-methoxymethyl or 2-ethoxymethyl derivatives (V; $R^5$=methyl, ethyl). Saponification of these compounds by conventional methods produces the corresponding free ethers (VI; $R^5$=methyl, ethyl).

Alternatively, the etherification may be effected by reacting at the reflux temperature the 2-hydroxymethyl compounds of Formula IV with an alkyl or aralkyl halide, preferably with an alkyl or aralkyl iodide, in an organic solvent such as acetone and in the presence of a base, such as potassium carbonate, or by treatment with an alkyl sulfate in acetone solution and in the presence of a base, preferably potassium hydroxide, at room temperature.

The following examples serve to illustrate but are not intended to limit the present invention.

*Example I*

A solution of 5 g. of 2-formyl-$\Delta^2$-androsten-17β-ol in 200 cc. of methanol was cooled to −5° C., treated with 1.5 g. of sodium borohydride in 30 cc. of methanol and the mixture was kept at room temperature for 1 hour under anhydrous conditions; at the end of this time it was cooled, the excess of reagent was destroyed with a few drops of glacial acetic acid and water was added until complete precipitation; the precipitate formed was collected by filtration, washed and dried, thus yielding 2-hydroxymethyl-$\Delta^2$-androsten-17β-ol; M.P. 193–194° C., $[\alpha]_D$+65° (chloroform).

A mixture of 1 g. of the above compound, 4 cc. of pyridine and 2 cc. of acetic anhydride was heated on the steam bath for 1 hour, poured into water and the precipitate formed was collected, washed with water to neutral and dried. By crystallization from acetone-hexane there was obtained 2-acetoxymethyl-$\Delta^2$-androsten-17β-ol acetate.

*Example II*

By following the method of the preceding example, but using 2-formyl-19-nor-$\Delta^2$-androsten-17β-ol as starting material, there was obtained 2-hydroxymethyl-19-nor-$\Delta^2$-androsten-17β-ol and its corresponding diacetate.

*Example III*

To a solution of 10 g. of 2-formyl-17α-methyl-$\Delta^2$-androsten-17β-ol in 300 cc. of anhydrous tetrahydrofuran was added 10 g. of sodium borohydride and the mixture was stirred at room temperature for 24 hours; at the end of this time the excess of reagent was destroyed with acetic acid, poured into ice water and the precipitate was collected. Crystallization from acetone-ether afforded 2-hydroxymethyl - 17α - methyl - $\Delta^2$-androsten-17β-ol; M.P. 167–169° C.; $[\alpha]_D$+26° (chloroform).

In another experiment there was employed anhydrous dioxane as solvent, with the same result.

A mixture of 1 g. of 2-hydroxymethyl-17α-methyl-$\Delta^2$-androsten-17β-ol, 10 cc. of pyridine and 1 cc. of acetyl chloride was kept at room temperature for 36 hours and then the solvent was evaporated under vacuum at a temperature below 60° C. Crystallization of the residue from methylene chloride-hexane furnished 2-acetoxymethyl-17α-methyl-$\Delta^2$-androsten-17β-ol.

*Example IV*

In accordance with the method of reduction described in the preceding example, there was treated 5 g. of 2-formyl-17α-ethyl-$\Delta^2$-androsten-17β-ol with sodium borohydride using tetrahydrofuran as solvent, thus yielding 2-hydroxymethyl-17α-ethyl-$\Delta^2$-androsten-17β-ol.

From a solution of 1 g. of the above compound in 130 cc. of benzene free of thiophene there was distilled approximately 30 cc. in order to remove moisture; there was then added 0.52 cc. of pyridine and 1.5 cc. of undecenoyl chloride and the mixture was refluxed for 1 hour; after evaporating to dryness under vacuum the residue was chromatographed on 30 g. of washed alumina, thus yielding 2-undecenoyloxymethyl-17α-ethyl-$\Delta^2$-androsten-17β-ol.

*Example V*

By following the method of reduction described in Example I, 2-formyl-17α-ethynyl-$\Delta^2$-androsten-17β-ol, 2-formyl-17α-vinyl-$\Delta^2$-androsten-17β-ol, 2-formyl-17α-vinyl-19-nor-$\Delta^2$-androsten-17β-ol and 2-formyl-17α-ethynyl-19-nor-$\Delta^2$-androsten-17β-ol were respectively converted into 2-hydroxymethyl-17α-ethynyl-$\Delta^2$-androsten-17β-ol, 2-hydroxymethyl - 17α-vinyl-$\Delta^2$-androsten-17β-ol, 2-hydroxymethyl - 17α - vinyl-19-nor-$\Delta^2$-androsten-17β-ol and 2-hydroxymethyl-17α-ethynyl-19-nor-$\Delta^2$-androsten-17β-ol.

*Example VI*

A solution of 500 mg. of 2-hydroxymethyl-$\Delta^2$-androsten-17β-ol in 2 cc. of pyridine was treated with 1 cc. of caproic anhydride and the mixture was kept overnight at room temperature; it was then poured into water and the precipitate formed was collected by filtration, thus affording the caproate of 2-capronoxymethyl-$\Delta^2$-androsten-17β-ol.

By the same method, but using propionic, valeric and cyclopentylpropionic anhydride as esterifying agents, there were obtained the corresponding diesters of 2-hydroxymethyl-$\Delta^2$-androsten-17β-ol.

*Example VII*

A mixture of 1 g. of 2-hydroxymethyl-17α-methyl-$\Delta^2$-androsten-17β-ol, 50 cc. of benzene, 2 cc. of acetic anhydride and 500 mg. of p-toluenesulfonic acid was kept at room temperature for 48 hours and then diluted with water; the benzene layer was separated, consecutively washed with 5% sodium carbonate solution and with water to neutral, dried over anhydrous sodium sulfate and evaporated to dryness under reduced pressure. By chromatography of the residue and crystallization of the solid fractions from acetone-ether there was obtained the acetate of 2 - acetoxymethyl-17α-methyl-$\Delta^2$-androsten-17β-ol.

In the same manner, but employing propionic, caproic, undecenoic and cyclopentylpropionic anhydrides as esterifying agents (the latter two being employed in twice the amount), there were obtained the propionate of 2-propionoxymethyl-17α-methyl-$\Delta^2$-androsten-17β-ol, the caproate of 2-capronoxymethyl-17α-methyl-$\Delta^2$-androsten-17β-ol, the undecenoate of 2-undecenoyloxymethyl-17α-methyl-$\Delta^2$-androsten-17β-ol and the cyclopentylpropionate of 2-cyclopentylpropionoxymethyl-17α-methyl-$\Delta^2$-androsten-17β-ol.

Example VIII 2 g. of 2-formyl-17α-methyl-19-nor-$\Delta^2$-androsten-17β-ol was reduced with sodium borohydride in tetrahydrofuran, following the method described in Example I; there was thus obtained 2-hydroxymethyl-17α-methyl-19-nor-$\Delta^2$-androsten-17β-ol.

The above compound was dissolved in 10 cc. of pyridine and 5 cc. of acetic anhydride, heated for 1 hour on the steam bath and poured into ice water; the precipitate formed was collected, thus giving 2-acetoxy-methyl-17α-methyl-19-nor-$\Delta^2$-androsten-17β-ol.

500 mg. of the latter compound was treated with 1 cc. of cyclopentylpropionic anhydride in benzene solution and in the presence of p-toluenesulfonic acid, in accordance with the method described in Example VII; there was thus obtained the cyclopentylpropionate of 2-acetoxymethyl-17α-methyl-19-nor-androsten-17β-ol.

Example IX

A mixture of 5 g. of 2-formyl-17α-methyl-$\Delta^2$-androsten-17β-ol, 200 cc. of acetic acid, 100 cc. of acetic anhydride and 5 g. of p-toluenesulfonic acid was kept at room temperature for 1 hour, poured into water, stirred for 30 minutes to hydrolyze the excess of anhydride and extracted several times with methylene chloride; the combined extract was washed to neutral, dried over anhydrous sodium sulfate and evaporated to dryness. The residue was dissolved in 100 cc. of 1% methanolic potassium hydroxide, kept at 0–10° C. for 1 hour, poured into water and extracted with ethyl acetate; the extract was washed with water to neutral, dried over anhydrous sodium sulfate and evaporated to dryness under vacuum. By crystallization from acetone-hexane there was obtained the acetate of 2-formyl-17α-methyl-$\Delta^2$-androsten-17β-ol.

The above compound was reduced with sodium borohydride in tetrahydrofuran, in accordance with the method of Example III, to produce the acetate of 2-hydroxymethyl-17α-methyl-$\Delta^2$-androsten-17β-ol.

By the same method 2-formyl-17α-ethyl-$\Delta^2$-androsten-17β-ol was converted into the respective acetate which on reduction afforded the acetate of 2-hydroxymethyl-17α-ethyl-$\Delta^2$-androsten-17β-ol.

Example X

A solution of 1 g. of the acetate of 2-hydroxymethyl-17α-methyl-$\Delta^2$-androsten-17β-ol in 100 cc. of ether was cooled to 0–5° C. and treated with an ether solution of diazomethane (prepared from 5 g. of nitrosomethylurea) and 3 drops of recently distilled boron trifluoride etherate. The mixture was kept at room temperature for 1 hour, treated with a few drops of acetic acid to destroy the excess of diazomethane and then evaporated to dryness; there was thus obtained 2-methoxymethyl-17α-methyl-$\Delta^2$-androsten-17β-ol, acetate.

A solution of 500 mg. of the above compound in 50 cc. of methanol was treated with 500 mg. of potassium hydroxide dissolved in 1 cc. of water and 5 cc. of methanol and the mixture was kept overnight at room temperature; it was then neutralized with acetic acid, concentrated to a small volume and diluted with water until complete precipitation. The product was collected by filtration and crystallized from methylene chloride-hexane, thus affording 2-methoxymethyl-17α-methyl-$\Delta^2$-androsten-17β-ol.

Example XI

To a solution of 10 g. of 2-formyl-$\Delta^2$-androsten-17β-ol in 40 cc. of pyridine was added 10 cc. of benzoyl chloride and the mixture was heated on the steam bath for 1 hour, cooled and poured into water; the precipitate formed was collected and recrystallized from chloroform-methanol, thus yielding the benzoate of 2-formyl-$\Delta^2$-androsten-17β-ol.

To a solution of 5 g. of the above benzoate in 100 cc. of anhydrous dioxane was added 5 g. of potassium borohydride and the mixture was stirred overnight at room temperature and under anhydrous conditions; the excess of reagent was destroyed with acetic acid, the mixture was poured into water and the product extracted with ethyl acetate. The organic extract was washed to neutral, dried and evaporated to dryness under vacuum. Crystallization from chloroform-methanol furnished the benzoate of 2-hydroxymethyl-$\Delta^2$-androsten-17β-ol.

By subsequent treatment with an excess of diazomethane, in accordance with the method of Example X, there was obtained the benzoate of 2-methoxymethyl-$\Delta^2$-andosten-17β-ol.

A solution of 500 mg. of the above compound in 25 cc. of 2% methanolic potassium hydroxide solution was refluxed for 2 hours, then neutralized with acetic acid, concentrated under vacuum to a small volume and poured into ice cold salt water; the precipitate formed was collected, washed and dried, thus giving 2-methoxymethyl-$\Delta^2$-androsten-17β-ol.

Example XII

There was repeated the process of the preceding example, but using the acetate of 2-formyl-19-nor-$\Delta^2$-androsten-17β-ol as starting material. There were thus successively obtained: the acetate of 2-hydroxymethyl-19-nor-$\Delta^2$-androsten-17β-ol, the acetate of 2-methoxymethyl-19-nor-$\Delta^2$-androsten-17α-ol and 2-methoxymethyl-19-nor-$\Delta^2$-androsten-17-ol.

Example XIII 1 g. of the caproate of 2-formyl-17α-vinyl-$\Delta^2$-androsten-17β-ol was reduced with sodium borohydride in dioxane solution, in accordance with the method of Example III, to produce the caproate of 2-hydroxymethyl-17α-vinyl-$\Delta^2$-androsten-17β-ol.

A solution of 500 mg. of the above compound in 75 cc. of ether was treated with an ether solution of diazomethane and 10 mg. of aluminum chloride; the mixture was kept at room temperature for 1 hour, the excess of diazomethane was destroyed by the addition of a few drops of acetic acid and evaporated to dryness, thus furnishing the caproate of 2-methoxymethyl-17α-vinyl-$\Delta^2$-androsten-17β-ol.

Example XIV

There was repeated the method of the preceding example, but using as starting materials the acetate of 2-formyl-17α-ethynyl-$\Delta^2$-androsten-17β-ol and its corresponding 19-nor analog, thus giving respectively 2-hydroxymethyl-17α-ethynyl-$\Delta^2$-androsten-17β-ol acetate, 2-methoxymethyl-17α-ethnyl-$\Delta^2$-androsten-17β-ol acetate, 2-hydroxymethyl-17α-ethynyl-19-nor-$\Delta^2$ androsten-17β-ol acetate and 2-methoxymethyl-17α-ethynyl-19-nor-$\Delta^2$-androsten-17β-ol acetate.

Example XV

There was repeated the method of Example X, but employing an ether solution of diazoethane instead of diazomethane, thus obtaining the acetate of 2-ethoxymethyl-17α-methyl-$\Delta^2$-androsten-17β-ol and then the corresponding free compound.

Example XVI

A mixture of 2 g. of the acetate of 2-hydroxymethyl-17α-methyl-$\Delta^2$-androsten-17β-ol, 100 cc. of anhydrous acetone, 10 cc. of methyl iodide and 2 g. of anhydrous potassium carbonate was refluxed for 48 hours. At the end of this time it was poured into water, extracted with ethyl acetate and the organic extract was washed with water, dried over anhydrous sodium sulfate and evaporated to dryness under vacuum. The residue was purified by chromatography on washed alumina, thus furnishing the acetate of 2-methoxymethyl-17α-methyl-Δ²-androsten-17β-ol, identical with the product obtained in Example X.

*Example XVII*

By following the method of the preceding example, but using ethyl, propyl or benzyl iodide instead of methyl iodide, the acetate of 2-hydroxymethyl-17α-ethyl-Δ²-androsten-17β-ol was converted into 2-ethoxymethyl-17α-ethyl-Δ²-androsten-17β-ol acetate, 2-propoxymethyl-17α-ethyl-Δ²-androsten-17β-ol acetate and 2-benzoxymethyl-17α-ethyl-Δ²-androsten-17β-ol acetate. By subsequent saponification of these compounds, in accordance with the method of Example X, there were obtained the respective free compounds.

*Example XVIII*

By following the method of acetylation described in Example III, 2-hydroxymethyl-17α-vinyl-Δ²-androsten-17β-ol and 2-hydroxymethyl-17α-ethynyl-Δ²-androsten-17β-ol were respectively converted into 2-acetoxymethyl-17α-vinyl-Δ²-androsten-17β-ol and 2-acetoxymethyl-17α-ethynyl-Δ²-androsten-17β-ol.

We claim:
1. A compound of the following formula:

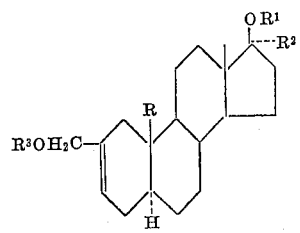

wherein R is selected from the group consisting of hydrogen and methyl; R¹ is selected from the group consisting of hydrogen and a hydrocarbon carboxylic acyl group of less than 12 carbon atoms; R² is selected from the group consisting of hydrogen, lower alkyl, lower alkenyl and lower alkynyl, and R³ is selected from the group consisting of hydrogen, lower alkyl and aralkyl containing up to eight carbon atoms.
2. 2-hydroxymethyl-Δ²-androsten-17β-ol.
3. 2-hydroxymethyl-17α-methyl-Δ²-androsten-17β-ol.
4. 2-hydroxymethyl-19-nor-Δ²-androsten-17β-ol.
5. 2-hydroxymethyl-17α-vinyl-Δ²-androsten-17β-ol.
6. 2-hydroxymethyl-17α-ethynyl-Δ²-androsten-17β-ol.
7. 2-hydroxymethyl-17α-methyl-19-nor-Δ²-androsten-17β-ol.
8. 2-hydroxymethyl-17α-ethynyl-19-nor-Δ²-androsten-17β-ol.
9. The propionate of 2-propionoxymethyl-Δ²-androsten-17β-ol.
10. The caproate of 2-capronoxymethyl-Δ²-androsten-17β-ol.
11. 2-methoxymethyl-Δ²-androsten-17β-ol.
12. 2-methoxymethyl-17α-methyl-Δ²-androsten-17β-ol.
13. The acetate of 2-methoxymethyl-Δ²-androsten-17β-ol.
14. 2-acetoxymethyl-17α-vinyl-Δ²-androsten-17β-ol.
15. 2-acetoxymethyl-17α-ethynyl-Δ²-androsten-17β-ol.

16. A process for preparing a compound of the following formula:

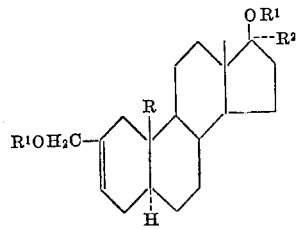

wherein R is selected from the group consisting of hydrogen and methyl; R¹ is selected from the group consisting of hydrogen and a hydrocarbon carboxylic acyl group of less than 12 carbon atoms; and R² is selected from the group consisting of hydrogen, lower alkyl, lower alkenyl and lower alkynyl, comprising reacting a compound of the following formula:

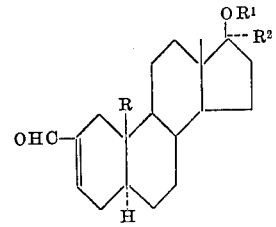

wherein R, R¹ and R² have the same meaning as above, with a double metal hydride to form the corresponding 2-hydroxymethyl compound and thereafter esterifying with a hydrocarbon carboxylic acid of less than 12 carbon atoms.

17. A process for preparing a compound of the following formula:

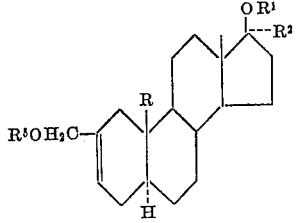

wherein R is selected from the group consisting of hydrogen and methyl; R¹ is selected from the group consisting of hydrogen and a hydrocarbon carboxylic acyl group of less than 12 carbon atoms; R² is selected from the group consisting of hydrogen, lower alkyl, lower alkenyl and lower alkynyl; and R⁵ is selected from the group consisting of lower alkyl and aralkyl containing up to 8 carbon atoms comprising reacting a compound of the following formula:

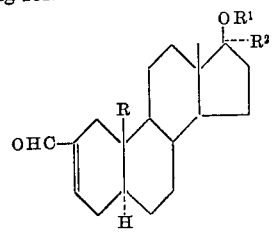

wherein R and R² have the same meaning as before and R¹ represents the hydrocarbon carboxylic acyl group of less than 12 carbon atoms, with a double metal hydride to form the corresponding 2-hydroxymethyl compound and thereafter reacting the latter compound with an etherfying agent.

No references cited.